Aug. 18, 1953     B. B. BROWN     2,649,519
ELECTRICAL LOW PRESSURE FLAT TIRE INDICATOR
Filed Dec. 18, 1951
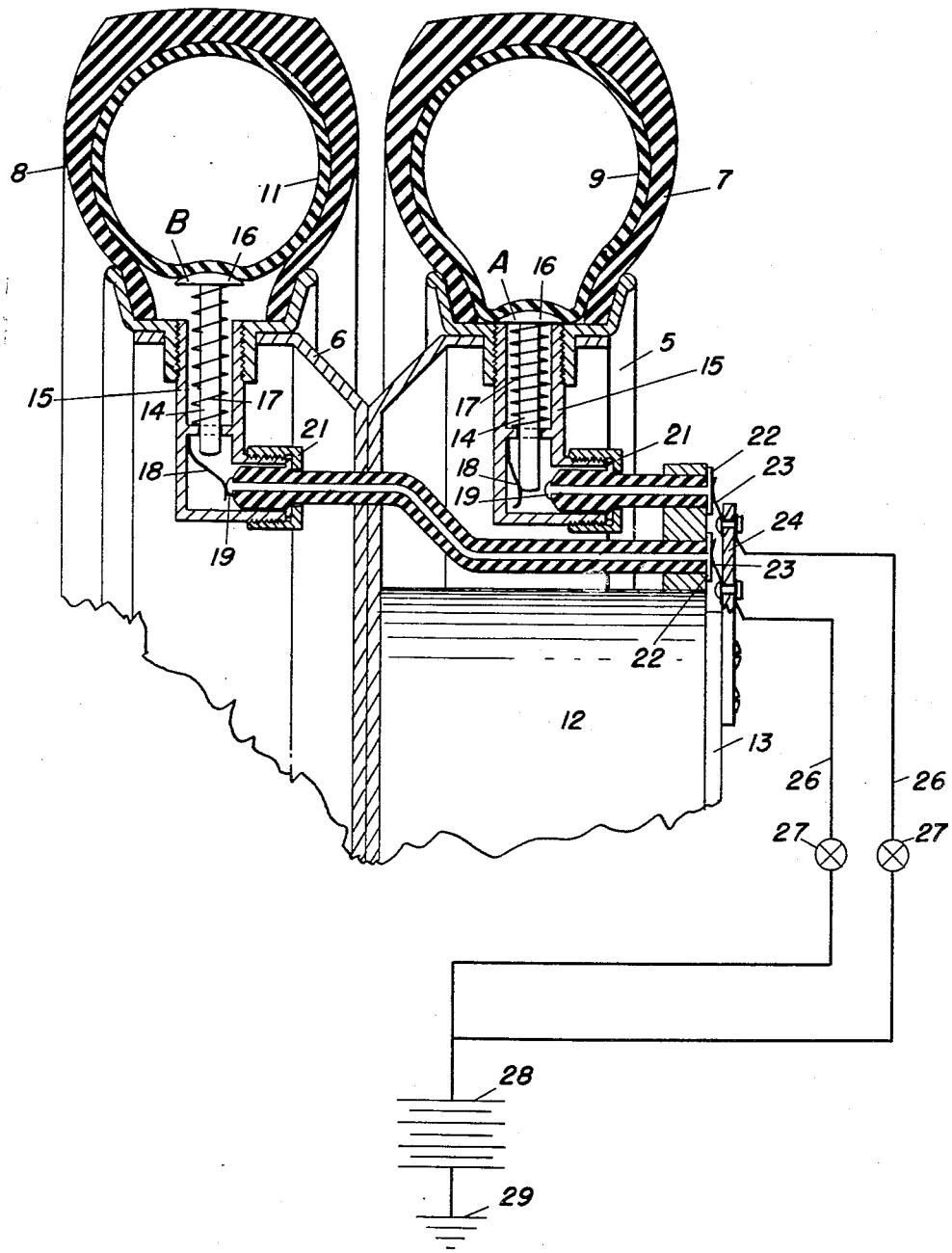
INVENTOR.
Boyd B. Brown
BY
Att'y Patented Aug. 18, 1953

2,649,519

UNITED STATES PATENT OFFICE 2,649,519

ELECTRICAL LOW PRESSURE FLAT TIRE INDICATOR

Boyd B. Brown, San Francisco, Calif.

Application December 18, 1951, Serial No. 262,260

1 Claim. (Cl. 200—58)

This invention relates to improvements in electrical low pressure flat tire indicators and has particular reference to means for indicating when either one of dual tires becomes deflated or is running under exceedingly low pressure.

The principal object of this invention is to provide means to indicate to the driver of a motor vehicle when any of his tires has become deflated or partly deflated so that the remaining tires will not be running under an excessive load.

A further object is to produce a device which may readily be attached to the ordinary tire and vehicle structure with a minimum amount of expense.

A further object is to produce a device which is economical to manufacture.

Other objects and advantages will be apparent during the course of the following description.

In the accompanying drawings forming a part of this specification and in which like numbers are employed to designate like parts throughout the same, the figure is a cross sectional view of a pair of dual tires showing my invention attached thereto and diagrammatically illustrating the wiring circuit.

On trucks and the like vehicles having dual tires, it is exceedingly difficult for the driver of the vehicle to know if one of the tires becomes deflated or partially deflated, due to the fact that these big trucks are usually drawn by a tractor remotely positioned with relation to the tires, and also due to the excessive noise of the tractor engine.

It is a fact that many highway accidents are caused by the fact that one of the dual tires becomes deflated and the other tire, having an excessive load, will blow out and cause tipping of the trailer, or excessive side sway, or what might be termed "jack-knifing."

Applicant has therefore devised a simple arrangement which may be attached to each rim of dual tires on a vehicle so that it is affected by the pressure within the tire in such a manner that a signal will be given in the cab of the vehicle.

In the accompanying drawings, wherein for the purpose of illustration is shown a preferred embodiment of my invention, the numerals 5 and 6 refer to the dual wheels upon which are mounted casings 7 and 8 respectively.

Each of these casings has an inner tube as shown at 9 and 11, respectively.

At 12 I have shown the customary brake drum and at 13 the customary mud guard which protects the brakes from road dirt.

My invention consists in attaching to each of the rims, as, for instance, the rim of the wheel 5, a L-shaped fitting 15, within which is slidably mounted a plunger 14 having a head 16, which underlies the tube 9. A spring 17 normally tends to push the plunger from the position shown in the right-hand portion of the drawing to that shown in the left-hand portion. The lower end of this plunger is adapted to contact a spring 18 which spring is in turn normally held away from an insulated contact 19, carried in the offset portion of the L-shaped fitting and held thereto by a nut 21.

The contact 19 has a rear contact portion 22, which is adapted to be engaged by a spring contact 23 supported from the stationary mud guard 13 by a supporting member 24. The spring contact 23 is connected by a wire 26 to a signal light 27 mounted in the cab of the vehcile and to one side of a battery 28, the opposite side of which is grounded as shown at 29.

The construction of the parts connected to the wheel 6 is identical to that just descrbied for those attached to the wheel 5 and therefore the same numerals are applied thereto.

The result of this construction is that as long as there is sufficient pressure in both tires to properly support the load, both plungers 14 will be depressed as shown at A. Therefore the spring 18 will be held away from the contact 19 and consequently there can be no flow of current through the signal lamp 27.

However, as soon as the air pressure in the tire is reduced until there is an unsafe condition, then the plungers will move to the position shown at B, at which time the spring 18 will engage the contact 19 and at each revolution of the wheel the contact 23 will complete an electrical circuit so that the signal light 27 in the cab will indicate the particular tire which is low in pressure, and at this time the driver can immediately rectify the condition so that there will be no danger of wrecking the vehicle or destroying the remaining good tire.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In combination with a wheel having a metal rim, a tire mounted thereon and an inner tube in said tire, a switch comprising a plunger slidable through the rim for engagement with the inner side of the tube, an L-shaped metallic casing having the outer end of the vertical leg thereof secured in the rim and enclosing said plunger, a coil spring surrounding the plunger and coacting with the plunger and vertical leg for normally forcing the plunger in an outward direction into engagement with the tube, an elongated switch contact insulatingly mounted in the horizontal leg of the L-shaped casing and projecting outwardly of the open end thereof, means for anchoring said contact in fixed position, a leaf spring switch contact at the inner end of the vertical leg of the L-shaped casing on the wall thereof opposite the horizontal leg of the casing in line with the elongated switch contact and normally held in spaced relation from the inner end of said elongated switch contact by said plunger and a source of electrical energy in communication with the outer end of the elongated switch contact and including a stationarily mounted contact member adapted to engage the outer end of the elongated contact during rotation of said wheel.

BOYD B. BROWN.

References Cited in the file of this patent

UNITED STATES PATENTS

| Number | Name | Date |
|---|---|---|
| 2,199,032 | Stoddard | Apr. 30, 1940 |
| 2,205,168 | Guthrie | June 18, 1940 |
| 2,347,541 | Critser et al. | Apr. 25, 1944 |
| 2,520,241 | Geraci et al. | Aug. 29, 1950 |

FOREIGN PATENTS

| Number | Country | Date |
|---|---|---|
| 351,155 | Great Britain | June 25, 1921 |